United States Patent
Kosuri et al.

(10) Patent No.: US 9,915,245 B2
(45) Date of Patent: Mar. 13, 2018

(54) REINFORCED PITCH BEARING OF A WIND TURBINE

(71) Applicant: Siemens Aktiengesellschaft, Munich (DE)

(72) Inventors: Srinivas Ratna Kosuri, Brande (DK); Christian Laursen, Hedensted (DK); Mujahid Shaik, Brande (DK); Akhilesh Shukla, Ikast (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 366 days.

(21) Appl. No.: 14/679,129

(22) Filed: Apr. 6, 2015

(65) Prior Publication Data

US 2015/0300322 A1   Oct. 22, 2015

(30) Foreign Application Priority Data

Apr. 17, 2014   (EP) .................................... 14165184

(51) Int. Cl.
*F16C 33/58* (2006.01)
*F16C 19/28* (2006.01)
(Continued)

(52) U.S. Cl.
CPC ........ *F03D 11/0008* (2013.01); *F03D 7/0224* (2013.01); *F03D 80/70* (2016.05);
(Continued)

(58) Field of Classification Search
CPC ...... F16C 19/28; F16C 33/585; F16C 33/586; F16C 43/04; F16C 2226/60;
(Continued)

(56) References Cited

U.S. PATENT DOCUMENTS 3,774,982 A * 11/1973 Nakamura .............. F16C 33/80
384/480
7,335,128 B2 * 2/2008 Flamang ................... F03D 1/00
416/170 R
(Continued)

FOREIGN PATENT DOCUMENTS

CA    2854719 A1 *  1/2015  ........... F03D 1/0658
EP    1925860 A1 *  5/2008  ......... B25B 27/0092
(Continued)

*Primary Examiner* — Marcus Charles
(74) *Attorney, Agent, or Firm* — Beusse Wolter Sanks & Maire (57) ABSTRACT

A reinforced pitch bearing of a wind turbine having a first reinforcement plate and a second reinforcement plate is provided. The pitch bearing includes an outer bearing ring and an inner bearing ring, whereby both bearing rings are arranged coaxially to each other, thus comprising a common axis of symmetry. The first reinforcement plate is arranged at a first axial end of the pitch and the second reinforcement plate is arranged at a second axial end of the pitch bearing. The reinforcement plates are arranged substantially parallel to each other and the pitch bearing includes further means for reinforcement arranged in between the first reinforcement plate and the second reinforcement plate. The invention also relates to a wind turbine having at least one rotor blade and at least one pitch bearing, pivotably connecting the rotor with a hub of the wind turbine.

11 Claims, 5 Drawing Sheets

(51) Int. Cl.
  *F16C 43/04* (2006.01)
  *F03D 11/00* (2006.01)
  *F03D 7/02* (2006.01)
  *F03D 80/70* (2016.01)

(52) U.S. Cl.
  CPC ............ *F16C 19/28* (2013.01); *F16C 33/585* (2013.01); *F16C 33/586* (2013.01); *F16C 43/04* (2013.01); *F05B 2240/40* (2013.01); *F05B 2260/79* (2013.01); *F16C 2226/60* (2013.01); *F16C 2300/14* (2013.01); *F16C 2360/31* (2013.01); *Y02E 10/722* (2013.01); *Y02E 10/723* (2013.01)

(58) Field of Classification Search
  CPC .. F16C 2300/14; F03D 11/0008; F03D 80/70; F03D 7/0224; F03D 7/296; F03D 1/633; F05B 2240/40; F05B 2260/79; F05B 2240/50; F05B 2230/60; Y02E 10/7222; Y02E 10/723
  USPC ....... 384/490, 510, 540, 542, 544, 537, 579, 384/584; 416/143, 182, 214 A, 244 R
  See application file for complete search history.

(56) References Cited

U.S. PATENT DOCUMENTS

| | | | |
|---|---|---|---|
| 8,628,301 B2 * | 1/2014 | Pasquet | F03D 1/0658 |
| | | | 416/148 |
| 9,523,348 B2 * | 12/2016 | Jacobsen | F03D 1/0633 |
| 2008/0213095 A1 | 9/2008 | Madden | |
| 2009/0311104 A1 | 12/2009 | Steffensen | |
| 2011/0142618 A1 | 6/2011 | Moore | |
| 2013/0177419 A1 | 7/2013 | Zaehr | |

FOREIGN PATENT DOCUMENTS

| | | | |
|---|---|---|---|
| EP | 2045464 A2 | 4/2009 | |
| EP | 2511521 A1 | 10/2012 | |
| EP | 2570655 A1 | 3/2013 | |
| EP | 2623772 A1 * | 8/2013 | ............ F03D 1/065 |
| EP | 3112669 A1 * | 1/2017 | ............ F03D 1/0658 |
| WO | WO-2013076754 A1 * | 5/2013 | ............ F03D 7/0224 |
| WO | 2013107452 A1 | 7/2013 | |

* cited by examiner

REINFORCED PITCH BEARING OF A WIND TURBINE

CROSS REFERENCE TO RELATED APPLICATIONS

This application claims the benefit of European Application No. EP14165184 filed Apr. 17, 2014, incorporated by reference herein in its entirety.

FIELD OF INVENTION

The invention relates to a pitch bearing of a wind turbine with an improved stiffness compared to existing pitch bearings of wind turbines. Furthermore, the invention relates to a wind turbine comprising such a pitch bearing. Finally, the invention relates to a method for reinforcing a pitch bearing of a wind turbine.

BACKGROUND OF INVENTION

Large, industrial type horizontal axis wind turbines typically comprise a pitch regulation for controlling the orientation of their rotor blades with regard to the incoming airflow of the wind. In comparison to a stall regulated wind turbine, where the rotor blades are rigidly fixed to the hub of the wind turbine, in pitch regulated wind turbines the rotor blades are pivotable mounted to the hub. This has the advantage that the orientation of the rotor blades with regard to the incoming airflow can be chosen such that the amount of generated electricity by the wind turbine is optimized.

Typically, the rotor blades are mounted to the hub via a bearing comprising an inner bearing ring and an outer bearing ring. The bearing may be a roller bearing, for instance a tapered roller bearing.

As wind turbines become larger and larger and consequently the rotor blades become larger and larger the forces which are transferred from the rotor blade to the hub via the pitch bearing increase as well. Thus, a reinforcement of the pitch bearing is advantageous.

In order to reinforce the pitch bearing the European patent application EP 2 045 464 A2 discloses a pair of reinforcing plates. These reinforcing plates are arranged such with regard to the inner bearing ring that they build a sandwich-type closed structure.

However, deformation of the pitch bearing, in particular of the inner bearing ring and/or of the outer bearing ring, may still occur if extreme forces are applied to the pitch bearing.

Thus, it would be advantageous to provide a pitch bearing with a further improved stiffness.

SUMMARY OF INVENTION

This objective is achieved by the independent claims. The dependent claims describe advantageous developments and modifications of embodiments of the invention.

In accordance with an embodiment of the invention there is provided a reinforced pitch bearing of a wind turbine comprising a first reinforcement plate and a second reinforcement plate. The pitch bearing includes an outer bearing ring and an inner bearing ring, whereby both bearing rings are arranged coaxially to each other, thus having a common axis of symmetry. The first reinforcement plate is arranged at a first axial end of the pitch bearing and the second reinforcement plate is arranged at a second axial end of the pitch bearing. The axial ends are defined with regard to the common axis of symmetry. The reinforcement plates are arranged substantially parallel to each other and the pitch bearing comprises further reinforcement, whereby the further reinforcement are arranged in between the first reinforcement plate and the second reinforcement plate.

A wind turbine refers to a device that can convert wind energy, i.e. kinetic energy from wind, into mechanical energy, which is subsequently used to generate electricity. A wind turbine is also denoted a wind power plant.

A rotor blade of a wind turbine is also denoted a wind turbine rotor blade.

The reinforcement plates have the shape of a plate, which means that their lateral extension is considerably larger than their thickness. As the outer bearing ring and the inner bearing ring both have preferably an annular shape, in a preferred embodiment the reinforcement plates have the shape of a circular cylinder. In other words, the cross section of the reinforcement plates in a top view of the pitch bearing is a circle.

Advantageously, the reinforcement plates are configured and arranged such that their outer limit coincides with the outer limit of the inner bearing ring.

The inner bearing ring and the outer bearing ring are arranged coaxially to each other. This means that the axis of rotational symmetry of the inner bearing ring and of the outer bearing ring coincides. Thus, both bearing rings have a common axis of symmetry. When a rotor blade is mounted to the hub of the wind turbine this common axis of symmetry of the pitch bearing coincides with an axis which is called the pitch axis of the rotor blade. The pitch axis of a rotor blade is commonly known as the axis about which the pitch regulation movement of the rotor blade is performed.

A first axial end can be attributed to the pitch bearing defined by the end of the pitch bearing in axial direction whereby axial refers to the common axis of symmetry of the pitch bearing. Likewise, a second axial end can be attributed to the pitch bearing, being defined as a second end of the pitch bearing in axial direction, whereby the first axial end is opposite to the second axial end. As the first reinforcement plate is arranged at the first axial end of the pitch bearing and the second reinforcement plate is arranged at the second axial end of the pitch bearing, the whole configuration can be described as a sandwich-type configuration. In other words, the two reinforcement plates close the inner bearing ring, thus generating a hollow space surrounded by the inner surface of the inner bearing ring and the two reinforcement plates.

The first reinforcement plate and the second reinforcement plate lead to a significant increase of the stiffness of the pitch bearing. However, deformation or other damage to the pitch bearing can still occur when high loads are applied to the wind turbine. A key aspect of the present invention is to introduce further reinforcement in the hollow space between the first reinforcement plate and the second reinforcement plate.

The further reinforcement for reinforcing the pitch bearing may advantageously be of cast iron, steel, carbon fiber, Kevlar and/or a combination of these materials.

Also note that different shapes differing from a shape of a plate are possible, too. Also note that alternative couplings of the further reinforcement and the reinforcement plates are possible, too.

An advantage of a reinforced pitch bearing as described above is that large diameters of the pitch bearing are possible while still maintaining a high fatigue limit.

Another advantage of the described reinforced pitch bearing is that the outer bearing ring and the inner bearing ring can be kept relatively thin, thus saving expensive material for the bearing rings, while the pitch bearing is reinforced by separate reinforcement which can be fabricated by separate material.

In particular, the reduction in bending stress may improve the fatigue reserve factor of the bolts and thus reduce the overall stress in the blade bolts under extreme loading. Investigations with the reinforced pitch bearing comparing to a conventional pitch bearing have proven a reduction between 2% and 10% in the total stress of the blade bolt.

Another advantage of coupling the two reinforcement plates via the further reinforcement is that if deformation of the pitch bearing under extreme loads occurs, the further reinforcement induce a reduced deformation of the sandwich-type reinforcement plates.

In an advantageous embodiment, the first reinforcement plate and the second reinforcement plate are coupled by the further reinforcement for reinforcing the pitch bearing in such a way that the stiffness of the pitch bearing is increased.

An advantage of coupling the further reinforcement with both reinforcement plates is that transfer of forces from one side of the pitch bearing to the other side is ensured. The connection between the further reinforcement and the reinforcement plates have to be carried out with care in order to ensure that the connection is sufficiently stable to withstand the loads acting on it. Note that wind turbines operate in harsh conditions during a lifetime exceeding 20 or even 25 years.

In another advantageous embodiment, the first reinforcement plate and/or the second reinforcement plate are substantially perpendicular to the common axis of symmetry.

As most relevant forces are acting in a direction substantially parallel to the common axis of symmetry of the pitch bearing, i.e. acting along the pitch axis, it is advantageous to place the reinforcement plates substantially perpendicular to the common axis of symmetry in order to maximize the resistance against deformation of the pitch bearing. When the reinforcement plates are attached to an upper surface and a lower surface of the inner bearing ring, it is thus advantageous if the inner bearing ring has an upper surface and a lower surface which is plane and which is substantially perpendicular to the common axis of symmetry.

In another advantageous embodiment, the first reinforcement plate and/or the second reinforcement plate are attached to the inner bearing ring.

Preferably, the reinforcement plates are attached to the inner bearing ring such that they fully cover the upper surface and the lower surface of the inner bearing ring. Thus, an optimal connection and an optimal transfer of forces between the inner bearing ring and the reinforcement plates are ensured.

In another advantageous embodiment, each reinforcement plate has at least one opening to access the interior of a wind turbine rotor blade mounted to the pitch bearing.

During assembling the wind turbine, in particular during mounting and attaching the wind turbine rotor blade to the hub it is advantageous if service personal has access to the inside of the wind turbine rotor blade. This may be realized by openings in the shell of the wind turbine rotor blade. However, in a particularly efficient and advantageous way this is realized by openings in both reinforcement plates. Thus, at least an access for machines or even for human beings is advantageous. For large pitch bearings, which may in practice easily exceed several meters in diameter, several openings in the reinforcement plates might be advantageous.

In another advantageous embodiment, the further reinforcement for reinforcing the pitch bearing includes at least one plate which is placed upright between the reinforcement plates.

A further reinforcement for reinforcing the pitch bearing is particularly advantageous if it has the shape of a plate being placed upright between the reinforcement plates because thus an optimal increase of the stiffness is achieved. The shape of a plate is also advantageous because it combines a minimum weight and volume of the further reinforcement with the provision of high stiffness. A minimum volume of the further reinforcement is advantageous in that it minimizes the weight of the pitch bearing, the material needed to provide the further reinforcement and consequently the cost of the reinforced pitch bearing.

Note that a placement upright between the reinforcement plates has to be understood that a plate including a lateral extension and a thickness is arranged such with regard to the reinforcement plates that the lateral extension of the further reinforcement is substantially perpendicular to the lateral extension of the reinforcement plates. This has the further advantage that a minimum lateral extension of the further reinforcement has to be provided. Compared, for instance, by an alternative arrangement where the further reinforcement are orientated with regard to the reinforcement plates in an angle, which is significantly different from 90 degrees.

In another advantageous embodiment, the further reinforcement includes at least two plates which are placed opposite to each other.

It is advantageous to provide several plates in order to further improve the stiffness of the pitch bearing.

It is furthermore advantageous to split the further reinforcement in several separate plates which leads to ease of manufacturing, ease of transportation of the further reinforcement and gives more flexibility of arranging the further reinforcement in between the space in between the two reinforcement plates.

It is also possible to provide more than two plates between the reinforcement plates, for instance four plates. These four plates may for instance be arranged such that they divide the cross section having the shape of a disc in four equal parts or sections.

In another advantageous embodiment, the further reinforcement for reinforcing the pitch bearing extend along an inner surface of the inner bearing ring.

In other words, the further reinforcement may also have the shape of at least a part of a hollow circular cylinder. The further reinforcement may be understood or may be configured such that they represent a third annular object building the pitch bearing. In other words, the further reinforcement may represent a second inner bearing ring having an outer diameter which is just slightly smaller than the inner diameter of the inner bearing ring.

Thus, in a further embodiment, the further reinforcement have an annular shape and are arranged coaxially with regard to the inner bearing ring.

In another advantageous embodiment, the further reinforcement are bolted to the reinforcement plates.

In principle, the further reinforcement can be connected to the reinforcement plates in various ways. As, however, it is advantageous to realize a stable and durable connection between the further reinforcement and the reinforcement plates a bolted connection is a preferred choice. Note, however, that in principle a connection which is realized by an adhesive or by pins or the like is possible, too.

It may be advantageous to use bolts which traverse the first reinforcement plate, the further reinforcement for reinforcing the pitch bearing and the second reinforcement plate. Thus, a sufficiently long bolt is preferably provided.

In another advantageous embodiment, the further reinforcement are bolted to the root of the wind turbine rotor blade.

A wind turbine rotor blade in principle includes a root and a root section, wherein the root section surrounds the root. In one alternative, the hub is attached and connected to the outer bearing ring and the rotor blade is connected to the inner bearing ring.

In any case it may be advantageous that the further reinforcement are bolted to the root of the wind turbine rotor blade thus directly and firmly interconnecting these two parts.

Exemplarily, the bolt traverses the further reinforcement and the first reinforcement plate and subsequently enters the root section of the wind turbine rotor blade. The described bolt connection which interconnects the root of the wind turbine rotor blade with the further reinforcement can be combined with the bolted connection between the further reinforcement and the reinforcement plates.

This has the advantage of providing a particularly stable and durable connection.

An embodiment of the invention is also directed towards a wind turbine having at least one wind turbine rotor blade, a hub and at least one pitch bearing according to one of the described embodiments, wherein the pitch bearing pivotably connects the wind turbine rotor blade with the hub.

Advantageously, all wind turbine rotor blades of the wind turbine are equipped with such a reinforced pitch bearing. This has the advantage that forces and fatigue limits are equally distributed with regard to the considered wind turbine rotor blades of the wind turbine.

Furthermore, an embodiment of the invention is directed towards a method for reinforcing a pitch bearing of a wind turbine, wherein the pitch bearing includes an outer bearing ring and an inner bearing ring, whereby both bearing rings are arranged coaxially to each other thus having a common axis of symmetry.

The method includes the following steps: attaching a first reinforcement plate to a first axial end of the pitch bearing and a second reinforcement plate to a second axial end of the pitch bearing, whereby the axial ends are defined with regard to the common axis of symmetry and the reinforcement plates are arranged substantially parallel to each other, and attaching further reinforcement for reinforcing the pitch bearing in between the first reinforcement plate and the second reinforcement plate.

The order of the different attachment steps can be performed in various ways. It may be advantageous to firstly attach the first reinforcement plate to the inner bearing ring, for instance, subsequently attach the further reinforcement to the first reinforcement plate and finally attach the second reinforcement plate to the further reinforcement and the inner bearing ring.

Alternatively, it may also be advantageous to first attach both reinforcement plates to the remaining part of the pitch bearing and subsequently introduce and connect the further reinforcement. This may be done via one or more openings of the reinforcement plates.

BRIEF DESCRIPTION OF THE DRAWINGS

Embodiments of the invention are now described, by way of example only, with reference to the accompanying drawings, of which.

DETAILED DESCRIPTION OF INVENTION

The illustration in the drawings is in schematic form. It is noted that in different figures, similar or identical elements may be provided with the same reference signs.

Figure 1:
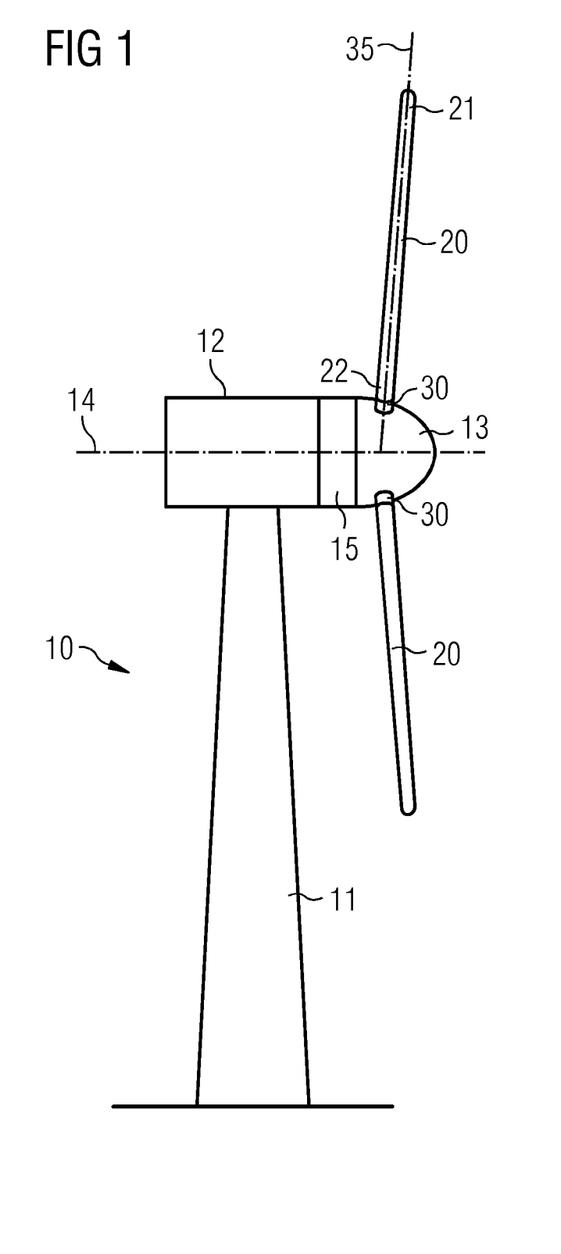
FIG. 1 shows a wind turbine with pitch regulated wind turbine rotor blades.

In FIG. 1, a wind turbine 10 is shown. The wind turbine 10 includes a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also includes a hub 13 with one or more rotor blades 20. Preferably, the wind turbine 10 includes three rotor blades 20. The hub 13 is mounted rotatable with regard to the nacelle 12 by means of a main bearing. The hub 13 is mounted rotatable about a rotor axis of rotation 14.

The wind turbine 10 furthermore includes a main shaft which connects the hub 13 with a rotor of a generator 15. If the hub 13 is connected directly to the rotor, the wind turbine is referred to as a gearless, direct drive wind turbine. Alternatively, the hub 13 may also be connected to the rotor via a gearbox. This type of wind turbine is commonly referred to as a geared wind turbine.

The generator 15 is accommodated within the nacelle 12. It includes the rotor and a stator. The generator 15 is arranged and prepared for converting the rotational energy from the rotor into electrical energy.

In the concrete example of FIG. 1, the wind turbine 10 includes three rotor blades 20 (of which two rotor blades 20 are depicted in FIG. 1). The rotor blades 20 are mounted rotatable with regard to the hub 13 by means of a pitch bearing 30. The rotor blades 20 may thus be pitched in order to optimize their orientation with regard to the wind flow impinging on the wind turbine 10.

Furthermore note that the rotor blades 20 each have a root section 22 and a tip section 21. The root section refers to the part of the rotor blade 20 which is closest to the hub 13 and the pitch bearing 30. The tip section 21 refers to the part of the rotor blade 20 which is furthest away from the root section 22.

Figure 2:
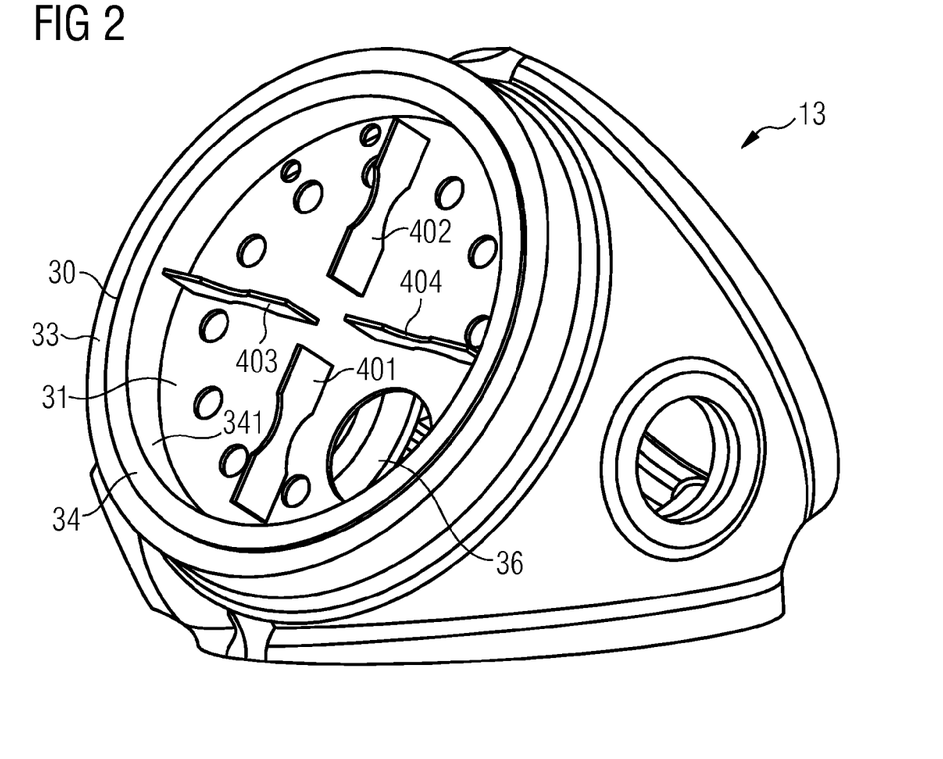
FIG. 2 shows a hub of a wind turbine with a reinforced pitch bearing.

In FIG. 2, a hub 13 of a wind turbine is depicted. The hub 13 includes three pitch bearings 30 of which one pitch bearing 30 is depicted. Furthermore, the hub 13 includes another large opening for the main bearing by which the hub is connected to the nacelle.

As can be seen, the pitch bearing 30 includes an outer bearing ring 33 and an inner bearing ring 34. Both bearing rings 33, 34 are arranged coaxially to each other. The outer bearing ring 33 is firmly interconnected to the hub 13 via a plurality of bolts (not shown). Likewise, the inner bearing ring 34 provides a plurality of holes (not shown) in which bolts for firmly interconnecting the inner bearing ring 34 with a root section of a rotor blade can be performed.

At the end of the pitch bearing 30 which faces the inside of the hub 13 a first reinforcement plate 31 is attached. The first reinforcement plate 31 includes the shape of a disk. It further has a plurality of openings 36 for providing an access between the inside of the hub 13 and the inside of the rotor blade 20 which is destined for being mounted to the pitch bearing 30. Note that the first reinforcement plate 31 includes one opening 36 which is sufficiently large for allowing a service personal to climb through and access the inside of the rotor blade.

FIG. 2 shows a specific embodiment of further reinforcement for reinforcing the pitch bearing 30. The further reinforcement include a first plate 401, a second plate 402, a third plate 403 and a fourth plate 404.

The four plates are distributed equally on the surface of the first reinforcement plate 31. They have the shape of a plate and are orientated upright, i.e. in an angle of substantially 90 degrees with regard to the first reinforcement plate 31. Thusb a particularly solid and robust construction of the pitch bearing 30 is realized.

Figure 3:
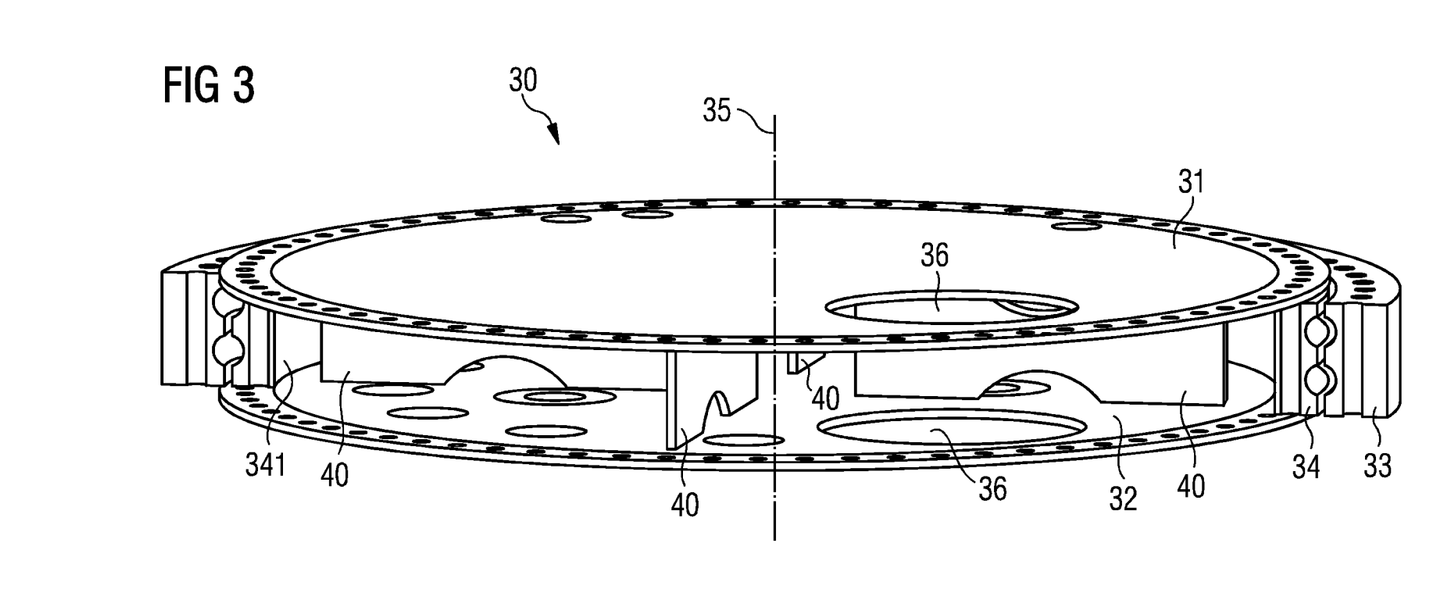
FIG. 3 shows a reinforced pitch bearing including four reinforcement plates arranged upright in between the first reinforcement plate and a second reinforcement plate.

In FIG. 3, a reinforced pitch bearing 30 is shown in more detail. The sandwich-type configuration of the two reinforcement plates 31, 32 can be well discerned. Both reinforcement plates 31, 32 are parallel to each other. It can be seen that the further reinforcement 40 are directly connected to both reinforcement plates 31, 32. It can also be seen that the inner bearing ring 34 includes an upper surface at a first axial end and a lower surface at a second axial end, whereby the axial ends refer to the common axis of symmetry 35 of the two bearing rings 34, 33. The reinforcement plates 31, 32 are flush with the outer surface of the inner bearing ring 34. In other words, the reinforcement plates 31, 32 fully cover the upper surface and the lower surface of the inner bearing ring 34, respectively. In other words, the two reinforcement plates 31, 32 close the inner bearing ring 34, thus generating a hollow space surrounded by the inner surface 341 of the inner bearing ring and the two reinforcement plates 31, 32.

Figure 4:
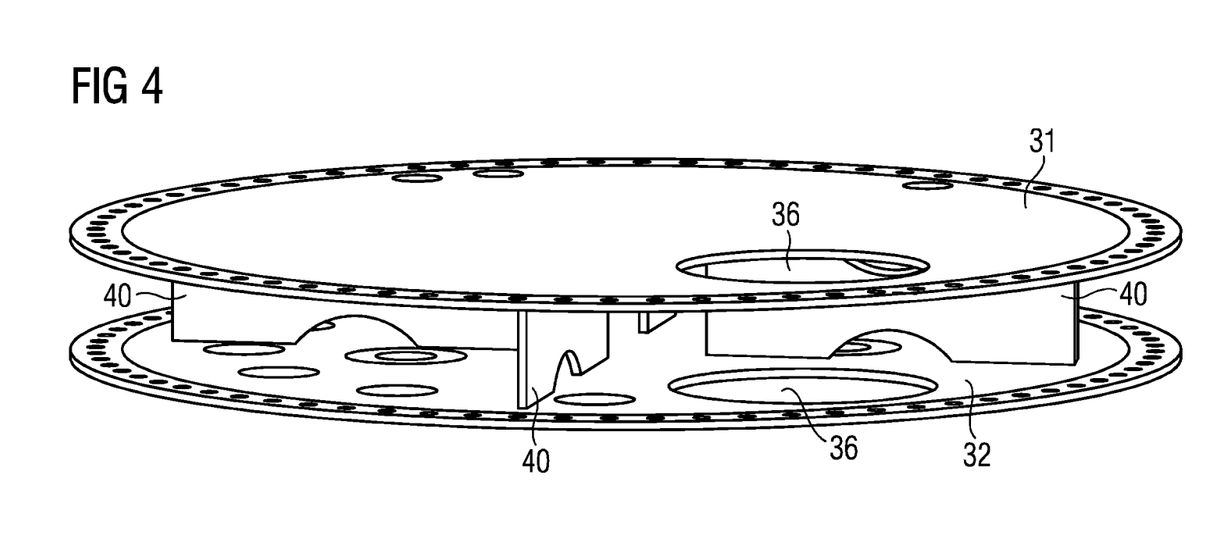
FIG. 4 shows a detailed view of FIG. 3 without the bearing rings.

FIG. 4 shows the same embodiment of the reinforced pitch bearing as shown in FIG. 3 without the inner bearing ring 34 and the outer bearing ring 33.

Figure 5:
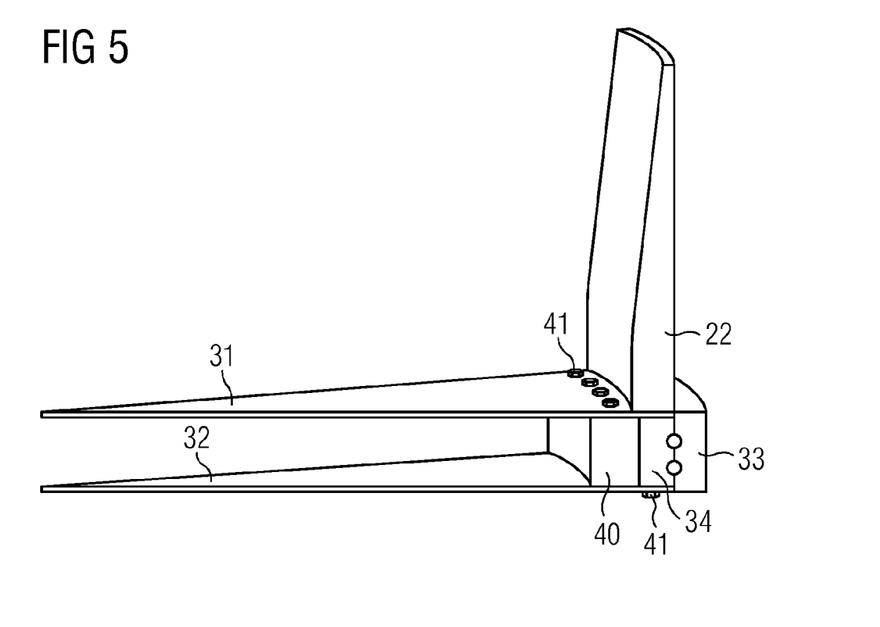
FIG. 5 shows a further reinforcement for reinforcing the pitch bearing having an annular shape.

FIG. 5 shows another embodiment of a reinforced pitch bearing. Again, an inner bearing ring 34 and an outer bearing ring 33 can be seen. Both bearing rings 33, 34 are arranged coaxially to each other. The pitch bearing is reinforced by a first reinforcement plate 31 and a second reinforcement plate 32. The pitch bearing is further reinforced by a stiffening block which serves as a further reinforcement 40 for reinforcing the pitch bearing. The further reinforcement 40 is attached to the reinforcement plates 31, 32 by a plurality of equally distributed bolts 41. Finally a part of a root section 22 of a rotor blade is visualized. The root section 22 of the rotor blade is bolted to the inner bearing ring 34 by bolts 41 which traverse the second reinforcement plate 32, the inner bearing ring 34, and the first reinforcement plate 31.

Figure 6:
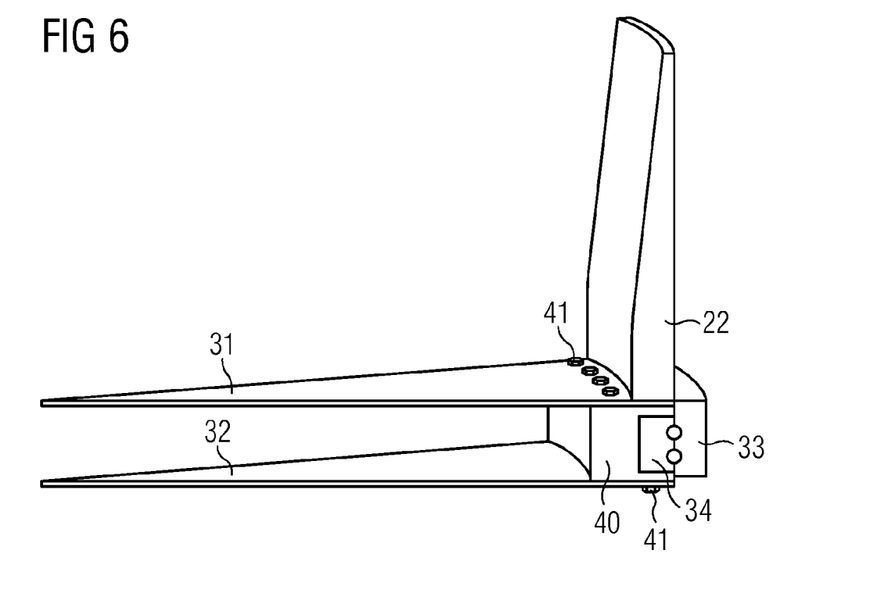
FIG. 6 shows a further reinforcement for reinforcing a pitch bearing having the shape of a C.

In FIG. 6 another embodiment of a reinforced pitch bearing is illustrated. This embodiment is similar to the embodiment shown in FIG. 5. However, in the embodiment of FIG. 6 the further reinforcement 40 for reinforcing the pitch bearing have a cross section that is similar to a C-shape. In other words, the further reinforcement 40 extend between the inner bearing ring 34 and the reinforcement plates 31, 32.

This has the advantage that it further improves the stiffness of the pitch bearing. Again the further reinforcement are attached to the remaining pitch bearing by means of a plurality of bolts 41 whereby a first set of bolts connects the further reinforcement 40 with the two reinforcement plates 31, 32 and a second set of bolts 41 connects the inner bearing ring 34, the two reinforcement plates 31, 32 with the root section 22 of the rotor blade.

Although the present invention has been described in detail with reference to preferred embodiments, it is to be understood that the present invention is not limited by the disclosed examples. In fact, numerous additional modifications and variations could be made thereto by a person skilled in the art without departing from the scope of the invention.

It should also be noted that the use of "a" or "an" throughout this application does not exclude a plurality, and "comprising", "including" or "having" does not exclude other steps or elements. Also elements described in association with different embodiments may be combined. It should furthermore be noted that reference signs in the claims should be construed as limiting the scope of the claims.

The invention claimed is:

1. A reinforced pitch bearing of a wind turbine comprising a first reinforcement plate and a second reinforcement plate,
wherein the pitch bearing comprises an outer bearing ring and an inner bearing ring, wherein both bearing rings are arranged coaxially to each other, thus comprising a common axis of symmetry,
wherein the first reinforcement plate is arranged at a first axial end of the pitch bearing and the second reinforcement plate is arranged at a second axial end of the pitch bearing, the axial ends being defined with regard to the common axis of symmetry,
wherein the reinforcement plates are arranged substantially parallel to each other,
wherein the pitch bearing comprises further reinforcement, the further reinforcement being arranged in between the first reinforcement plate and the second reinforcement plate, and
wherein the further reinforcement comprise at least two plates which are placed opposite to each other.

2. The reinforced pitch bearing according to claim 1, wherein both reinforcement plates are coupled by the further reinforcement for reinforcing the pitch bearing such that the stiffness of the pitch bearing is increased.

3. The reinforced pitch bearing according to claim 1, wherein the first reinforcement plate and/or the second reinforcement plate are substantially perpendicular to the common axis of symmetry.

4. The reinforced pitch bearing according to claim 1, wherein the first reinforcement plate and/or the second reinforcement plate are attached to the inner bearing ring.

5. The reinforced pitch bearing according to claim 1, wherein each reinforcement plate comprises at least one opening to access the interior of a rotor blade of the wind turbine mounted to the pitch bearing.

6. The reinforced pitch bearing according to claim 1, wherein the further reinforcement comprise at least one plate which is placed upright between the reinforcement plates.

7. A wind turbine comprising
at least one rotor blade,
a hub and
at least one pitch bearing according to claim 1,
wherein the pitch bearing pivotably connects the rotor blade with the hub.

8. A reinforced pitch bearing of a wind turbine comprising a first reinforcement plate and a second reinforcement plate, wherein the pitch bearing comprises an outer bearing ring and an inner bearing ring, wherein both bearing rings are arranged coaxially to each other, thus comprising a common axis of symmetry, wherein the first reinforcement plate is arranged at a first axial end of the pitch bearing and the second reinforcement plate is arranged at a second axial end of the pitch bearing, the axial ends being defined with regard to the common axis of symmetry, wherein the reinforcement plates are arranged substantially parallel to each other, wherein the pitch bearing comprises further reinforcement, the further reinforcement being arranged in between the first reinforcement plate and the second reinforcement plate, and wherein each reinforcement plate comprises at least one opening to access the interior of a rotor blade of the wind turbine mounted to the pitch bearing.

9. A reinforced pitch bearing of a wind turbine comprising a first reinforcement plate and a second reinforcement plate, wherein the pitch bearing comprises an outer bearing ring and an inner bearing ring, wherein both bearing rings are arranged coaxially to each other, thus comprising a common axis of symmetry, wherein the first reinforcement plate is arranged at a first axial end of the pitch bearing and the second reinforcement plate is arranged at a second axial end of the pitch bearing, the axial ends being defined with regard to the common axis of symmetry, wherein the reinforcement plates are arranged substantially parallel to each other, wherein the pitch bearing comprises further reinforcement, the further reinforcement being arranged in between the first reinforcement plate and the second reinforcement plate, and wherein the further reinforcement comprises an annular stiffening block which abuts the inner bearing ring.

10. The reinforced pitch bearing according to claim 9, wherein the stiffening block comprises a groove in a radially outer surface with respect to the common axis of symmetry, and wherein the inner bearing ring is disposed in the groove.

11. The reinforced pitch bearing according to claim 9, wherein the stiffening block is bolted to a root of a rotor blade of the wind turbine.

* * * * *